United States Patent [19]

Yamanaka et al.

[11] 4,149,182
[45] Apr. 10, 1979

[54] COLOR SIGNAL MODULATING SYSTEM

[75] Inventors: Seisuke Yamanaka, Mitaki; Toshimichi Nishimura, Tama, both of Japan

[73] Assignee: Sony Corporation, Tokyo, Japan

[21] Appl. No.: 872,063

[22] Filed: Jan. 25, 1978

[30] Foreign Application Priority Data

Jan. 31, 1977 [JP] Japan ................................ 52-9562

[51] Int. Cl.² ............................................. H04N 9/07
[52] U.S. Cl. ......................................... 358/43; 358/44
[58] Field of Search ................................... 358/41–50, 358/11, 12, 16, 23, 31

[56] References Cited

U.S. PATENT DOCUMENTS 3,548,087  12/1970  Shimada ............................ 358/43
3,971,065  7/1976   Bayer ............................... 358/44

Primary Examiner—John C. Martin
Attorney, Agent, or Firm—Hill, Gross, Simpson, Van Santen, Steadman, Chiara & Simpson

[57] ABSTRACT

A color signal modulating system for a color television camera having two CCD's as image pick-up devices for converting optical images into two color signals at alternate scan lines and into a third color signal at consecutive scan lines. Means are provided for developing two color difference signals, one of which is developed from alternate lines of scan. The color difference signals are used to modulate a carrier signal at alternate lines, and means are provided to derive sequentially modulated first and second color difference signals simultaneously at an output of the signal modulating system.

8 Claims, 6 Drawing Figures

COLOR SIGNAL MODULATING SYSTEM

BACKGROUND OF THE INVENTION

1. Field of the Invention

The field of art to which this invention pertains is a color television camera and in particular to a color modulating system for such cameras.

2. Description of the Prior Art

Color cameras have been developed in the prior art using CCD's where at least two of three primary colors, R, G and B, are obtained in a line sequential manner. In such systems, signals from adjacent two lines must be mixed together in order to develop a simultaneous color composite signal for each scan line. The simultaneous color composite signal is a color signal modulated at a subcarrier frequency and is represented by a chroma signal of the NTSC color composite type signal.

In such a prior art system, R and B, for example, are obtained in a line sequential manner. Upon generating a simultaneous color composite signal for a certain line, such as the $(2n + 1)$th line, where $n = 0, 1, 2, \ldots$, R and G on the $(2n + 1)$th line and B on the $(2n)$th line are mixed. In this case, color difference signals $E_{B-Y}$ and $E_{R-Y}$ on $(2n + 1)$th line are expressed as follows:

$$E_{R-Y} = R(2n + 1) - Y(C) = 0.7R(2n + 1) - 0.59G(2n + 1) - 0.11B(2n)$$

$$E_{B-Y} = B(2n) - Y(C) = 0.89B(2n) - 0.59G(2n + 1) - 0.30R(2n + 1)$$

where $Y(C)$ is a luminance signal and is expressed as follows:

$$Y(C) = 0.30R(2n + 1) + 0.59G(2n + 1) + 0.11B(2n).$$

In this case, respective color signals are $$E_R = R(2n + 1)$$

$$E_G = G(2n + 1) + 1.695[Y(C) - Y(N)]$$

$$= G(2n + 1) + 1.695 \cdot 0.11[B(2n) - B(2n + 1)]$$

$$E_B = B(2n)$$

wherein $Y(N)$ is a standard luminance signal of the NTSC color system type on the $(2n + 1)$th scan line and is expressed as follows:

$$Y(N) = 0.30R(2n + 1) + 0.59G(2n + 1) + 0.11B(2n + 1).$$

Assuming that $B(2n) = B(2n + 1)$, $E_G$ and $E_B$ are expressed as follows:

$$E_G = G(2n + 1)$$

$$E_B = B(2n + 1).$$

If the vertical correlation of adjacent lines is sufficiently strong, color dot signals at the edge of a black and white object are not visible. On the contrary, such dot-like patterns are undesirably visible when there is little or no vertical correlation between signals from adjacent lines. This is an extremely unfavorable characteristic.

SUMMARY OF THE INVENTION

It is an important feature of the present invention to provide an improved color television camera.

It is another feature of the present invention to provide a color television camera which has means for developing first and second color difference signals and for modulating a carrier by said first and second color difference signals alternately line-by-line.

It is a principal object of the present invention to provide a color television camera which has means for reducing the visibility of color dot signals on the edge of black and white objects.

It is another object of the present invention to provide a television camera as described above including means for deriving sequentially modulated first and second color difference signals simultaneously at an output of the color signal modulating system.

These and other objects, features and advantages of the present invention will be understood in greater detail from the following description and the associated drawings wherein reference numerals are used to designate preferred embodiments

DESCRIPTION OF THE PREFERRED EMBODIMENTS

Figure 1:
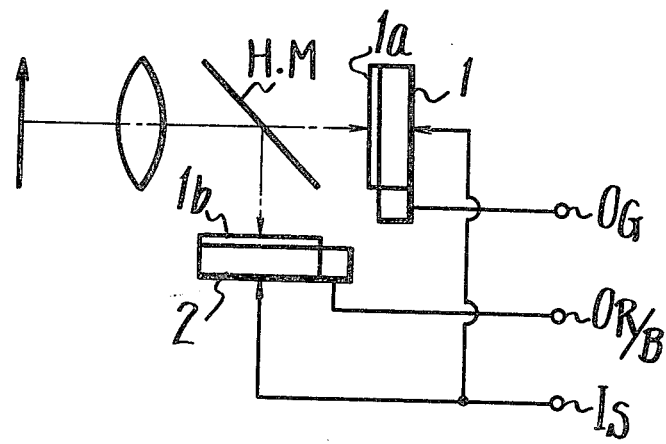
FIG. 1 is a diagrammatic illustration of first and second CCD's or image pick-up devices which receive split images from an image focusing lens and which have color filters disposed in the respective image paths.
Figure 2A:
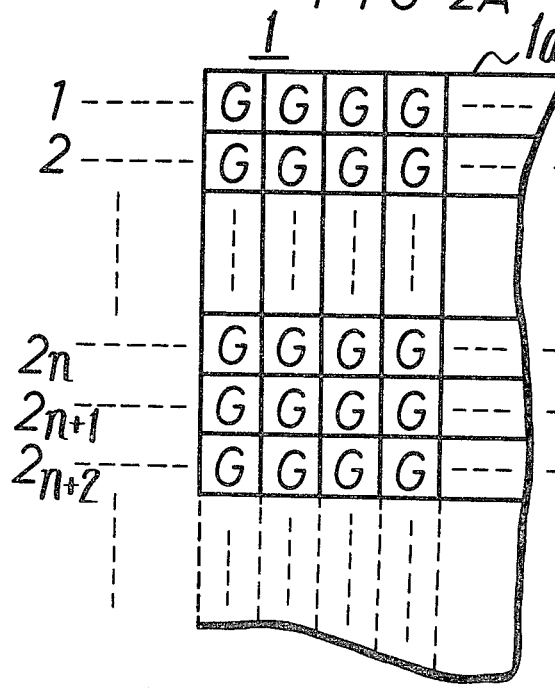
FIGS. 2A and 2B show the composition of the filter elements of the respective filters utilized in the diagram of FIG. 1.
Figure 2B:
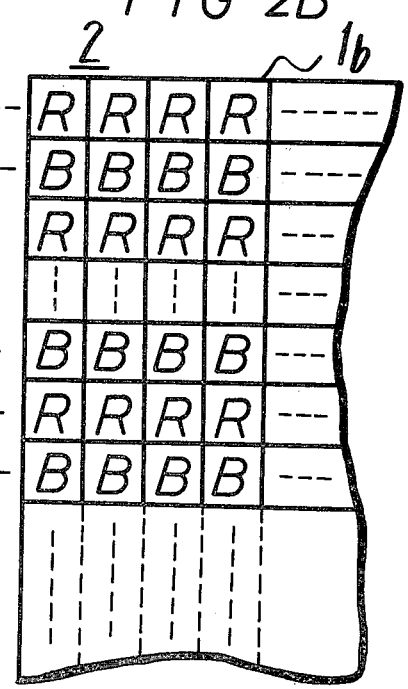

FIGS. 1, 2A and 2B show a color camera system according to this invention. CCD imaging devices 1 and 2 each have a predetermined number of picture elements aligned in both horizontal and vertical directions. A half-mirror, H.M., is situated for splitting light from an object into two light paths. Color filters 1a and 1b, as depicted in FIGS. 2A and 2B, respectively, are positioned in front of each imaging device. As will be understood by those skilled in the art, the imaging device 1 supplies a signal G corresponding to a green color component of the incoming light to a terminal $O_G$. In a similar manner, the imaging device 1b supplies a signal B/R, which corresponds alternately to a blue color component and a red color component of the incoming light to a terminal $O_{R/B}$.

The imaging devices 1 and 2 are supplied with a necessary driving pulse through a terminal $I_S$.

Figure 3:
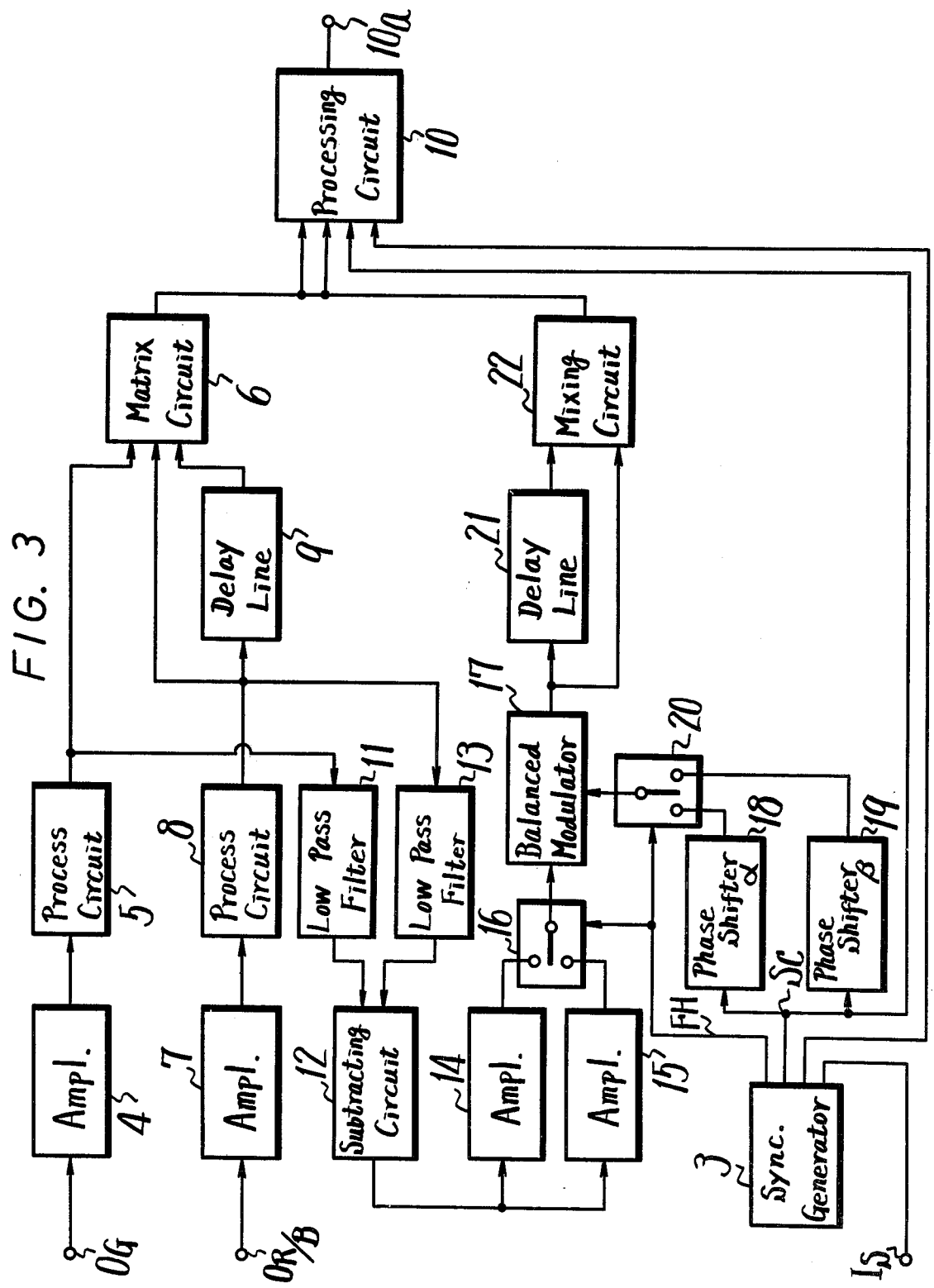
FIG. 3 is a block diagram of a color signal modulating system according to the present invention.

In FIG. 3, signal G from the terminal $O_G$ is supplied through an amplifier 4 to a process circuit 5 where signal processes, such as $\alpha$-correction and black level setting, are performed. Similarly, the signal R/B is supplied through an amplifier 7 to a process circuit 8. Outputs from both process circuits 5 and 8 are fed to a matrix circuit 6 for producing a luminance signal Y. A delay line which produces a delay of one horizontal scan (1H) is located between the output of the process circuit 8 and the matrix circuit 6.

Both output signals from the process circuits 5 and 8 are fed to a subtracting circuit 12 through low pass filters 11 and 13, respectively. The cut-off frequency of the low pass filters 11 and 13 is selected to be between 0.5 MHz and 1.0 MHz, for example. As a result, a signal [B(2n) − G(2n)] and a signal [R(2n + 1) − G(2n + 1)] are alternately obtained at the output of the subtracting circuit 12 on a line-by-line basis.

The output from the subtractor 12 is fed to amplifiers 14 and 15 simultaneously. Amplification factors of 0.63 for the amplifier 14 and 0.45 for the amplifier 15 are provided. Both outputs from these amplifiers are selectively supplied to a balanced modulator 17 through a switch 16. A sync generator 3 is installed in this system for supplying necessary pulses, such as transfer pulses for CCD imaging devices and subcarrier and composite sync signals to suitable points in the system. One of the signals generated at the sync generator 3 is a subcarrier SC of 3.58 MHz which is fed to two-phase shifters 18 and 19, which provide phase shift angles of α° and β°, where:

$$\alpha° = 90° - 13.5° = 76.5°$$

$$\beta° = 180° + 13° = 193°$$

Both outputs of the phase shifters 18 and 19 are fed to the balanced modulator 17 through a switch 20. The switches 16 and 20 are simultaneously operated in response to the presence of a horizontal sync signal FH from the sync generator 3.

For example, switches 16 and 20 are switched to the amplifier 15 and the phase shifter 19 during the period when a signal of [B(2n) − B(2n)] is obtained at the output of the subtracting circuit 12. At other times, these switches are switched to the amplifier 14 and the phase shifter 18, namely when a signal [B(2n + 1) − G(2n + 1)], is obtained at the output of the subtracting circuit 12.

The balanced modulator 17 supplies signals $E_1$ and $E_2$ alternately line-by-line of the form:

$$E_1 = 0.63 \,[R(2n + 1) - G(2n + 1)] \cos (2\pi fst + \theta_R)$$

$$E_2 = 0.45 \,[B(2n)] \sin (2\pi fst + \theta_R)$$
$$fs = 3.58 \text{ MHz}$$

$$\theta_R \approx 13.5°$$

$$\theta_B \approx -13°$$

To simultaneously process the signals $E_1$ and $E_2$, the output from the balanced modulator 17 is fed to a mixing circuit 22 and a 1H delay circuit 21 which is connected to the mixing circuit 22. The mixing circuit 22 provides a chrominance signal of the NTSC color standard variety, which is fed to a processing circuit 10.

The processing circuit 10 receives a composite sync signal and the subcarrier SC of 3.58 MHz from the sync generator 3, the luminance signal from the matrix circuit 6 and the chrominance signal from the mixing circuit 22. An output terminal 10a delivers the composite color video signal of the NTSC color standard variety.

Figure 4:
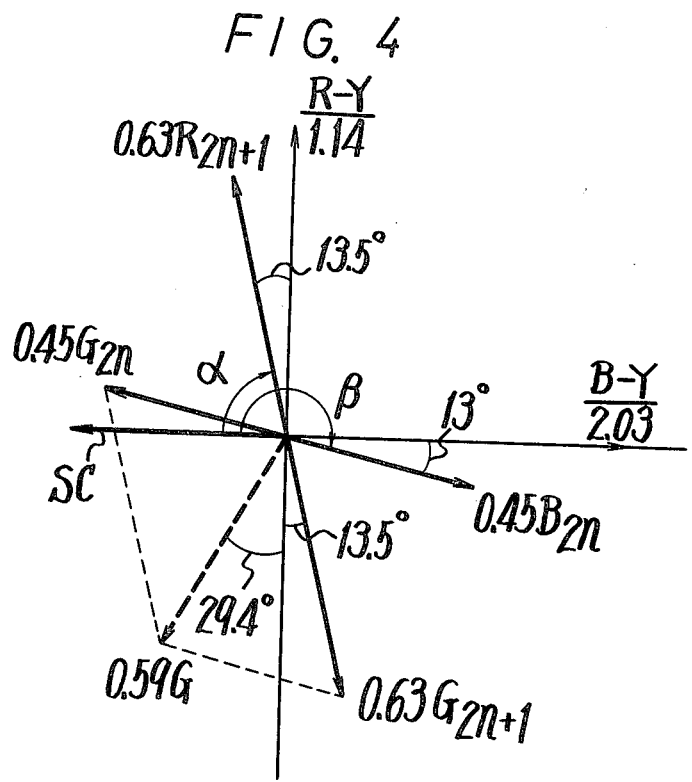
FIG. 4 is a vector diagram showing the vector addition of signals to produce a composite color signal similar to the signal produced by the standard NTSC system.

In summary, the operation of the present invention may be explained as follows. In the present system, a color signal is obtained by the methods of modulating and simultaneous processing. The related vector diagram is shown in FIG. 4. When a black and white object is picked up (as shown above) $E_1$ and $E_2$ become zero, because $R(2n + 1) = G(2n + 1)$, and $B(2n) = G(2n)$. Therefore, an undesirable dot-like color pattern does not occur in the case of black and white objects. By vector summing 0.45G(2n) and 0.63G(2n + 1), as shown in FIG. 4, a composite color signal similar to the NTSC variety is obtainable.

Figure 5:
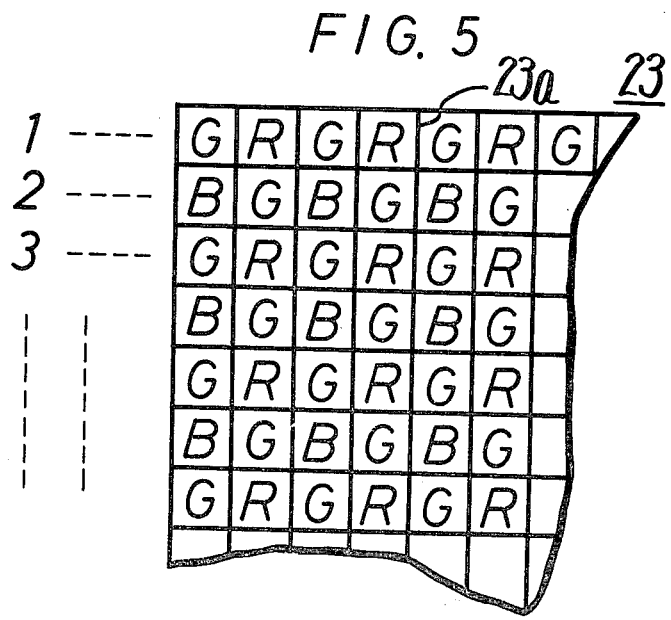
FIG. 5 illustrates an alternate form of the invention where a single CCD chip is used in place of the two chips shown in FIG. 1 and a composite color filter is used which can be seen to be a composite of the filters shown in FIGS. 2A and 2B.

In another form of the invention, a single chip CCD color camera may be used. In this modified case, color filter 23a, as depicted in FIG. 5, is disposed in front of a single CCD 23. By using the color coding of filter 23a, signals corresponding to red and blue are obtained from the CCD 23 alternately line-by-line, while a signal corresponding to green is obtained every consecutive line. It is apparent then that the principles of this invention are adaptable to a single chip imaging device.

It will also be apparent to those skilled in the art that various other modifications may be accomplished without departing from the spirit of the invention as outlined in the attached claims.

We claim:

1. A color signal modulating system for a color television camera having a transducer for converting optical images into two color signals which correspond to two of three primary colors of said image, said two color signals being generated alternately in a line sequential manner and a third color signal being generated consecutively in a line sequential manner comprising:
    means for developing a first color difference signal representing the difference between said third color signal and a first one of said two color signals during alternate lines of scan of said camera,
    means for developing a second color difference signal representing the difference between said third color signal and the second one of said two color signals,
    carrier signal generating means,
    modulation means for modulating said carrier signals by said first and second color difference signals alternately line-by line, and
    means for deriving said sequentially modulated first and second color difference signals simultaneously at an output of said color signal modulating system.

2. A color signal modulating system in accordance with claim 1 wherein said two-color signals are signals representative of red and blue colors and wherein said third color signal is a signal representative of green color.

3. A color signal modulating system in accordance with claim 1 wherein said transducer comprises first and second image pick-up devices, and wherein means are provided to focus an image onto said pick-up devices, first and second color filters being provided in the light paths of an image being focused on said first and second image pick-up devices, respectively.

4. A color signal modulating system in accordance with claim 3 wherein said first color filter passes green light for each line of scan of said color camera and wherein said second filter passes alternate lines of red and blue light.

5. A color signal modulating system in accordance with claim 1 wherein said first color difference signal represents the difference between said red signal and said green signal and wherein said second color difference signal represents the difference between said blue signal and said green signal.

6. A color signal modulating system in accordance with claim 5 wherein said means for developing said first color difference signal includes a first gain setting means for adjusting the level of said first color difference signal prior to it being modulated at said modulating means, said means for developing said second color difference signal includes a second gain set means for adjusting the level of said second color difference signal prior to it being modulated at said modulating means.

7. A color signal modulating system in accordance with claim 6 wherein said modulating means includes means for phase-shifting said carrier signal by a predetermined phase angle for given lines of scan of said camera.

8. A color signal modulating system in accordance with claim 7 wherein said means for deriving said sequentially modulated signals of said first and second color difference signals simultaneously includes a delay line having a delay equal to the time of one horizontal scan of said camera and a signal mixing circuit for mixing said difference signals, at least one of which includes a delay interval produced by said delay line.

* * * * *